OR 3,705,986

Dec. 12, 1972 R. W. SANDERS ET AL 3,705,986

OPTICAL DATA TRANSMISSION SYSTEM

Filed Jan. 25, 1971 6 Sheets-Sheet 1

Dec. 12, 1972 R. W. SANDERS ET AL 3,705,986

OPTICAL DATA TRANSMISSION SYSTEM

Filed Jan. 25, 1971 6 Sheets-Sheet 2

OPTICAL DATA TRANSMISSION SYSTEM

Filed Jan. 25, 1971 6 Sheets-Sheet 3

OPTICAL DATA TRANSMISSION SYSTEM

Filed Jan. 25, 1971

3,705,986

OPTICAL DATA TRANSMISSION SYSTEM

Ray W. Sanders and David W. Luce, Los Angeles, and William Quan, Oxnard, Calif., assignors to Computer Transmission Corporation, Los Angeles, Calif.

Filed Jan. 25, 1971, Ser. No. 109,236
Int. Cl. H04b 9/00
U.S. Cl. 250—199 6 Claims

ABSTRACT OF THE DISCLOSURE

Disclosed is a point-to-point digital data transmission system employing pulse modulated infrared or light beams. The system includes a pair of optical transceiver units which link one computer installation to another via line of sight communications. The system also includes interface units connecting respective optical units to their associated computer installation. The interface units encode, modulate, demodulate and transfer received data. The system includes means to automatically synchronize with incoming data and further provide a source of synchronizing signals for use by associated computer equipment.

BACKGROUND OF THE INVENTION

In recent years, greatly expanded use of digital computers for business and technology has been experienced. Particularly, the use of a common central computer with a number of remotely located input-output terminals is now becoming well established as a highly efficient and economical mode of computer usage.

Typically, the central computer is located in one building of a complex such as a university or industrial establishment and specialized input-output terminals are located in other buildings near the laboratories, or offices which generate or use the data. The central computer-remote terminal type of system has proven to be very workable and flexible. Only the required input-output devices needed for each remote terminal need be located at each remote terminal and as needs, capacity or locations change, the remote terminals may be moved or changed accordingly at minimum costs. The large central computer constituting the major investment is fixed and yet accessible to all remote terminals wherever they are.

One economic and flexibility restriction encountered in the past has been the need for telephone type communications lines between each remote terminal and the central computer. Often these communications lines must be installed in telephone conduits and connected via switchboards to the computer. The cost of the interconnections becomes significant and flexibility of the system reduced. Also, the entire computer system is subject to distortions and interruptions of the telephone and switchboard service. The transmission of information from point-to-point employing wire and radio links has become well established in the communications field. Likewise, the modulation of light beams particularly monochromatic energy from lasers is of course known in the art. However, their utilization in high speed, reliable data transmission has heretofore been ineffective.

BRIEF DESCRIPTION OF THE INVENTION

We have therefore invented a new optical transmission system designed particularly to link computer installations as a direct substitution for land lines without modification. The system employs a pair of infrared transceivers each including one infrared emitting device and one photo detector positions in side-by-side relation each with suitable optics directed in parallel paths. A pair of transceivers positioned in facing relationship at distances of 50 to 5000 feet spacing provide full duplex, or one way communications between the points.

Each optical unit includes the infrared emitter, infrared photo detector, signal modulator and receiver circuits. Associated with each optical unit is an interface unit which includes a transmitter section P which receives a digital bit stream from the data source, for example, data terminal, equipment, and converts it into the proper form for modulating the infrared emitting diode of the optical unit. The receiver subsection of the interface unit converts the incoming energy over the optical link to a bit stream for use by the associated data terminal equipment. The interface units also include clock generators for use in the modulation function and to control the data terminal equipment when external clock signals are required to be furnished by the system.

One feature of the invention resides in the combination of an infrared emitter and pulse modulator as a data transmission medium. Another feature of the invention involves an optical detector with means for automatically synchronizing a demodulator with an incoming signal.

Still another feature of this invention resides in the combination of a pair of optical transceivers with internal synchronizing means whereby the system is constantly operative and fully synchronized both internally at each station and together (loop synchronization) whether incoming data is present or not.

A related feature involves the arrangement for automatically searching and synchronizing with incoming data.

One further feature includes means for initiating both internal or loop synchronization at any time.

BRIEF DESCRIPTION OF THE DRAWINGS

These features may be more clearly understood from the following detailed description and by reference to the drawing in which.

DETAILED DESCRIPTION OF THE INVENTION

Figure 1:
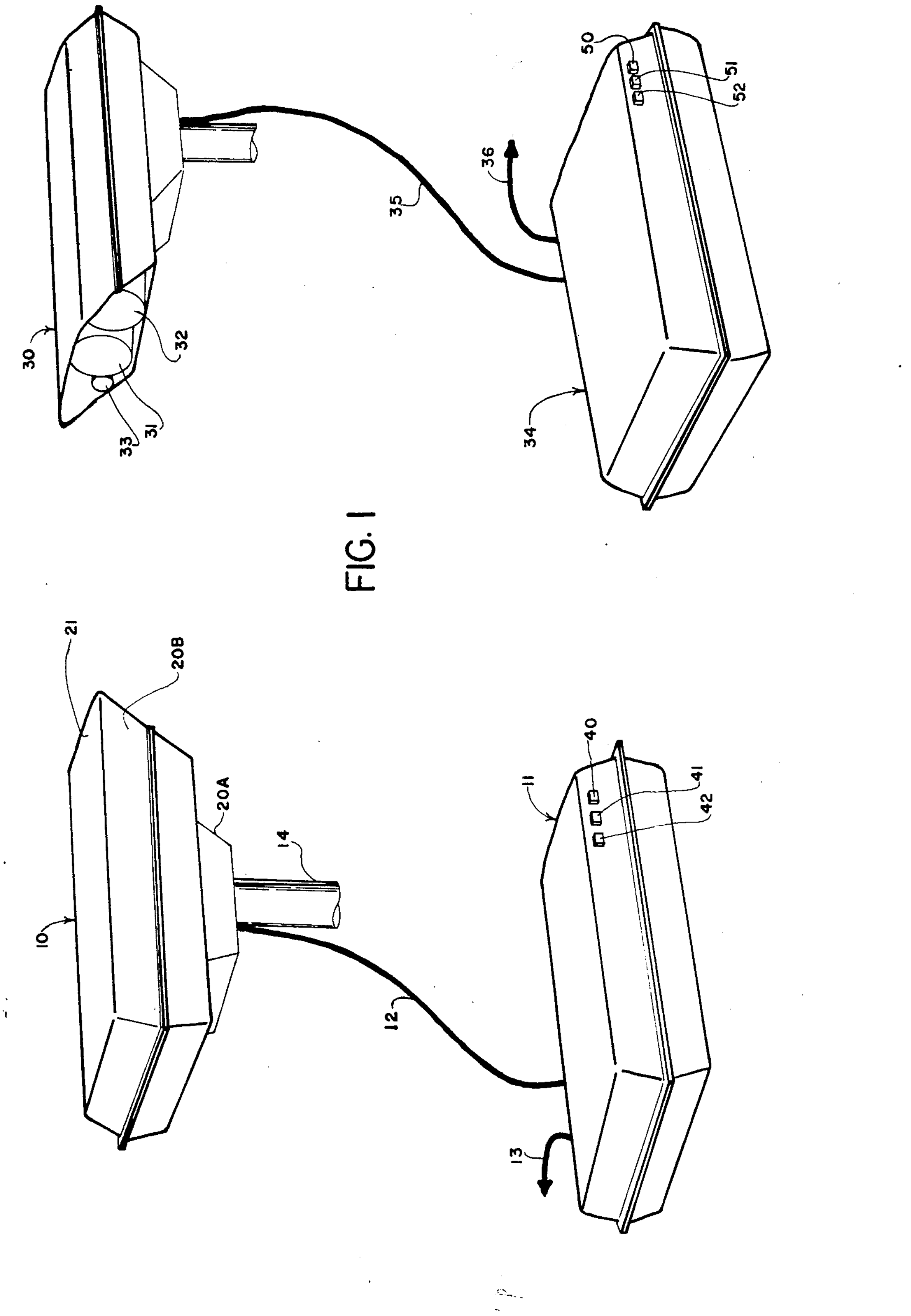
FIG. 1 is a perspective view of the exterior housings of a system in accordance with this invention.

Now referring to the drawing of FIG. 1, a complete system in accordance with this invention is shown as comprising a first optical unit 10 having an associated interface unit 11 connected together by cable 12. The interface unit 11 is likewise connected to a nearby computer or data handling device, unshown in FIG. 1, by cable 13. The first optical unit 10 is mounted on a support pole 14 by a mounting bracket shown in FIG. 5 and covered by a two piece shroud 20A and B, including a brow portion 21 which overhangs the front of the optical unit 10 to protect the optics from the weather and from extraneous light. This overhanging brow 21 is better seen on he optical unit 30 which is positioned in spaced face-to-face relation with the optical unit 10. Within the optical unit 30, two optical assemblies 31 and 32 appear in side-by-side relation accompanied by an internal boresight telescope 33. The optical unit 10 is normally identical with optical unit 30 for full duplex operation. Associated with the optical unit 30 is its interface unit 34 connected together by cable 35 and the interface unit is connected to its associated computer unit by cable 36.

The two interface units 11 and 34 contain the only operating controls required for the system. They include on interface unit 11 a power switch 40 to energize the interface unit 11 and first optical unit 10 and two controls for checking out and testing the synchronization of the system. These are the loop local test control 41 and the loop optical test control 42, the operation of this is explained below in connection with the operation of the system. The interface unit 34 has equivalent controls 50, 51 and 52.

Figure 2:
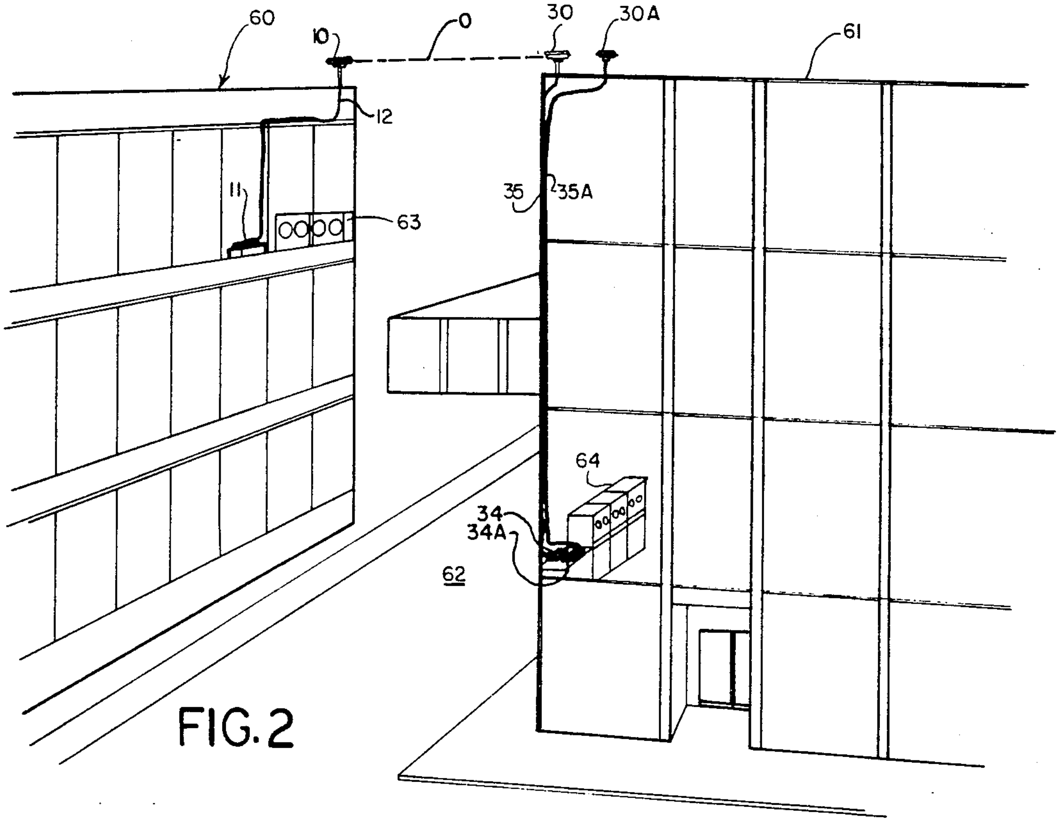
FIG. 2 is a perspective view of a typical system installation.

A typical installation is shown in FIG. 2 providing data communications service between buildings 60 and 61, separated by a thoroughfare 62. The optical units 10 and 30 are shown mounted on roof tops axis desirable for easy installation and providing an optical path 0 free from obstructions or interference. The cable 12 connects the first optical unit 10 to its interface unit 11 which is shown in the same room with a data unit 63. The second optical unit 30 is connected by cable 35 to interface unit 34 at the central computer 64. An additional optical unit 30A is mounted on building 61 and directed toward another remote installation (unshown in the drawing). The optical unit 30A has its cable 35A and interface unit 34A also serving the central computer 64. Note that the only cable installations are at each separate building and no switched connections appear between the central computer and each remote terminal.

Figure 3:
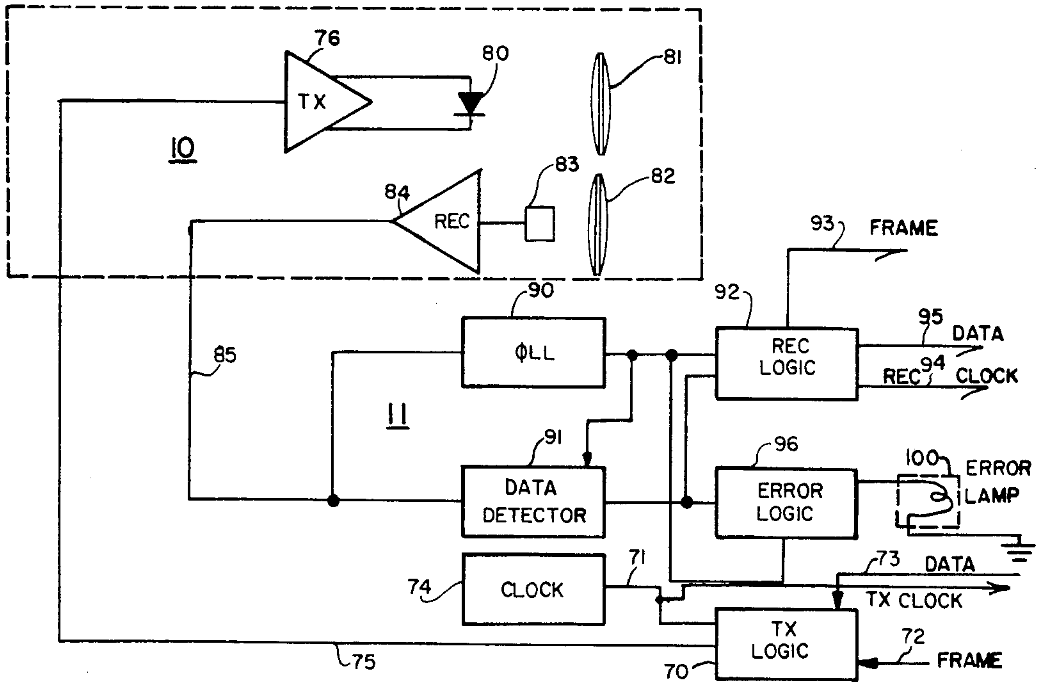
FIG. 3 is a block diagram of one terminal installation of the system of this invention.

The optical unit and interface assemblies making up an installation for either a remote or control computer terminal are virtually identical and interchangeable, adding further flexibility to the system. A block diagram of the installation 10–11 is shown in FIG. 3. The interface unit 11 includes a transmit logic circuit 70 which receives three forms of inputs:

incoming or local clock pulses over lead 71 from an internal clock 74;
frame pulses over lead 72; and,
transmit data over lead 73.

Figures 7, 8:
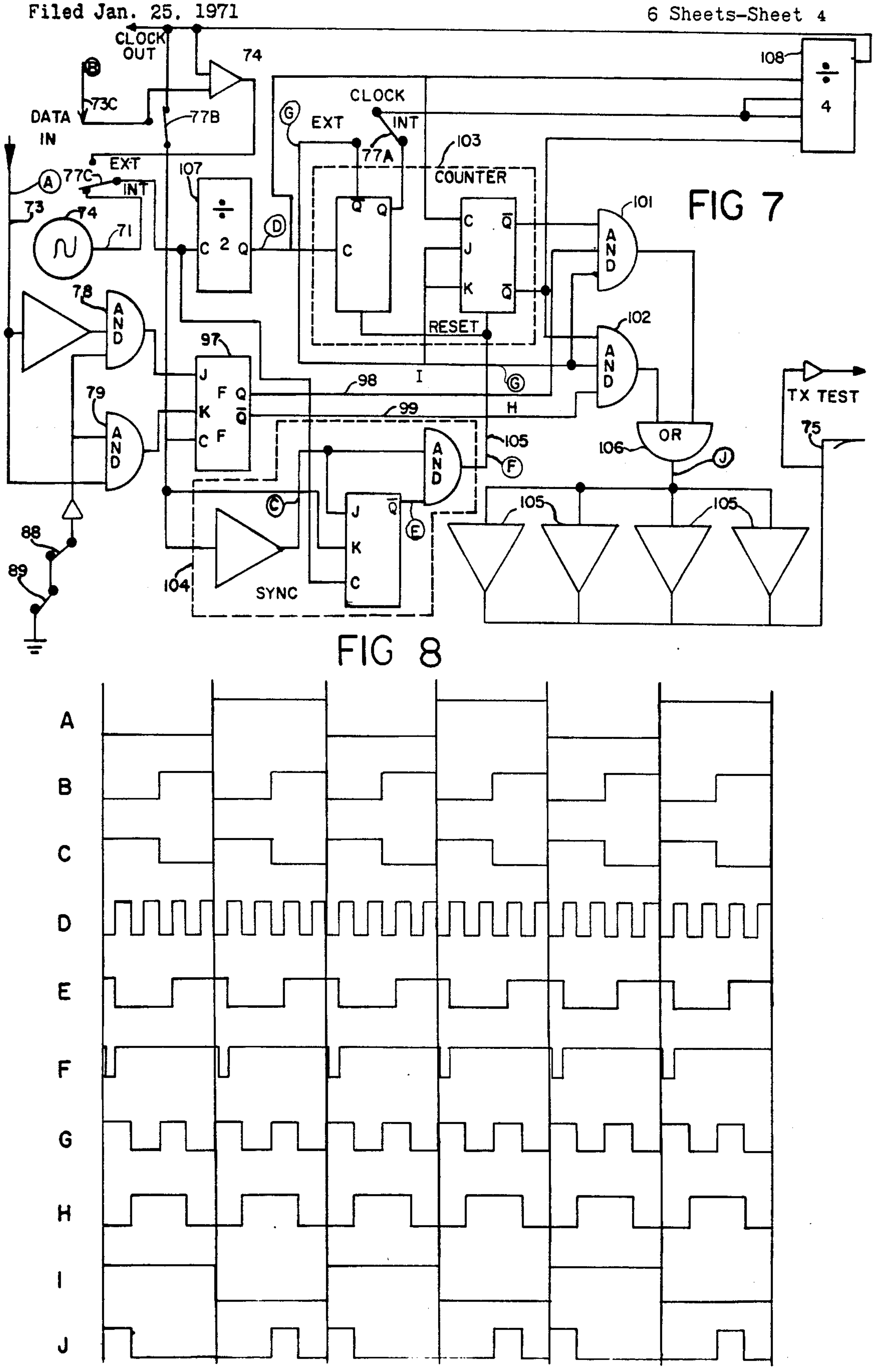
FIG. 7 is a block diagram of the transmitter subsystem of this invention.
FIG. 8 is the transmitter timing diagram.

The transmit logic circuit 70 and its operation are described below in more detail in FIG. 7 and its associated timing diagram FIG. 8.

The transmit logic circuit 70 serves to produce a pulse train which is applied over lead 75 to the optical unit 10 where a transmit amplifier 76 drives a photoemitting diode 80, the actual signal transmitter of the system. Aligned with the emitting area of diode 80 is an optical system for collimating the emitted energy. The optical system is represented in this figure as simple lens 81.

Positioned side-by-side with the diode 80 and its optical system 81 is a similar lens assembly 82 aligned with a photo-receptive device 83 for receiving signals from its matching optical data transmitter and receiver assembly 30 of FIG. 2. The output at photo-receptive device 83 is amplified in receiver amplifier 84 and the amplified receiver signal transmitted over lead 85 to a phase-locked loop circuit 90 for establishing synchronism between assemblies 10 and 30 and a data detector 31. The phase-locked loop circuit 90 controls a receiver logic circuit 92 for passing received frame, clock and data signals to the data equipment served over leads 93, 94 and 95, respectively. The system also includes error logic circuitry 96 which detects out-of-synchronism, loss of signal or other error conditions either in the single assembly or in the loop. An error signal lamp 100 powered by the error circuit is illuminated whenever such condition occurs.

As is apparent from FIG. 2, the circuitry of the interface unit 11 is located inside of a building where the data equipment is and therefore protected from the elements. The electronic circuitry of the optical units 10 and 30 appears in FIG. 4 while the physical arrangement is illustrated in FIGS. 4 and 6.

Figure 6:
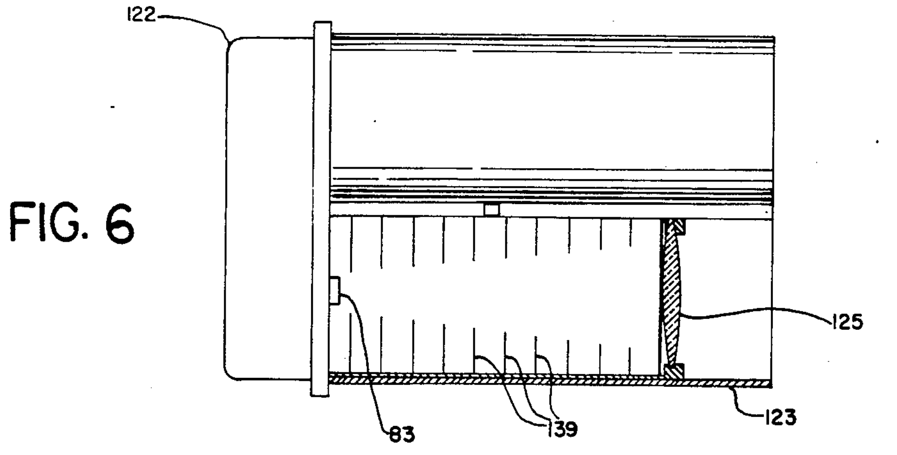
FIG. 6 is a horizontal section through the optical unit of FIG. 4 taken along lines 6—6 of FIG. 5.
Figure 4:
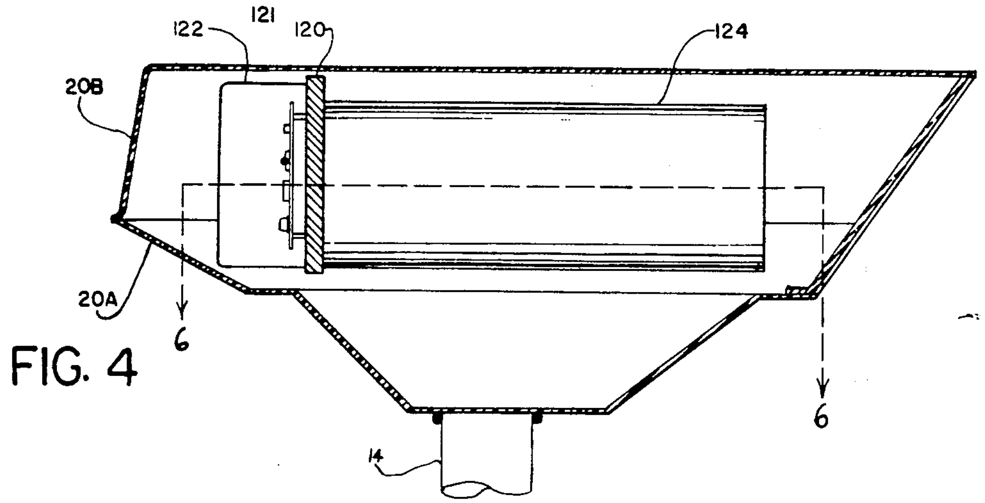
FIG. 4 is a vertical section through an optical unit of FIG. 1.
Figure 5:
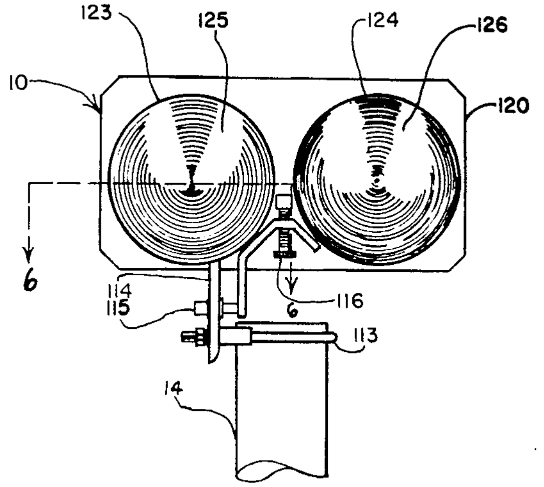
FIG. 5 is a front elevational view ofthe optical unit of FIGS. 1 and 3 with the housing removed.

Referring now to FIGS. 4–6, the optical unit 10 is enclosed within the fiberglass protective shroud 20 including a base 20A and a cover 20B and a transparent window 110 mounted on the bottom of 20A at an angle with respect to the optics unit 10 to minimize reflections. The optical assembly of unit 10 is mounted within the shroud 20 on a supporting pipe or post 14 by a U clamp 113 in FIG. 5, or equivalent means which engages a bracket 114 of the optical unit 10. The bracket 114 includes an azimuth and elevation adjusting screws 115 and 116 which are used for precise alignment of the optical unit 10 with its matching unit 30 of FIG. 1.

The optical unit 10 itself comprises basically a vertically mounted frame 120 supporting on its rear face the optic unit circuitry 121 within its cover 122 and on its front face a pair of tubular baffle and lens assemblies 123 and 124, including front mounted lens 125 and 126, respectively, and internal baffles 139 best seen in FIG. 6 for minimizing the internal reflection of radient energy which might interface with the reliable operation of the system. At the inner end of the baffle and lens assemblies 123 and 124 are the photo-active elements, including the photo-responsive diode 83, mounted on the frame 120 and aligned with the lens 125. The photo-responsive diode 83 is electrically connected to the circuitry 121. Completing the optical unit 10 is a boresight telescope permanently mounted on the tubular assembly 123 but omitted from these figures since it does not form an operational part of the system but used for alignment purposes only.

Optical unit circuits

Figure 11:
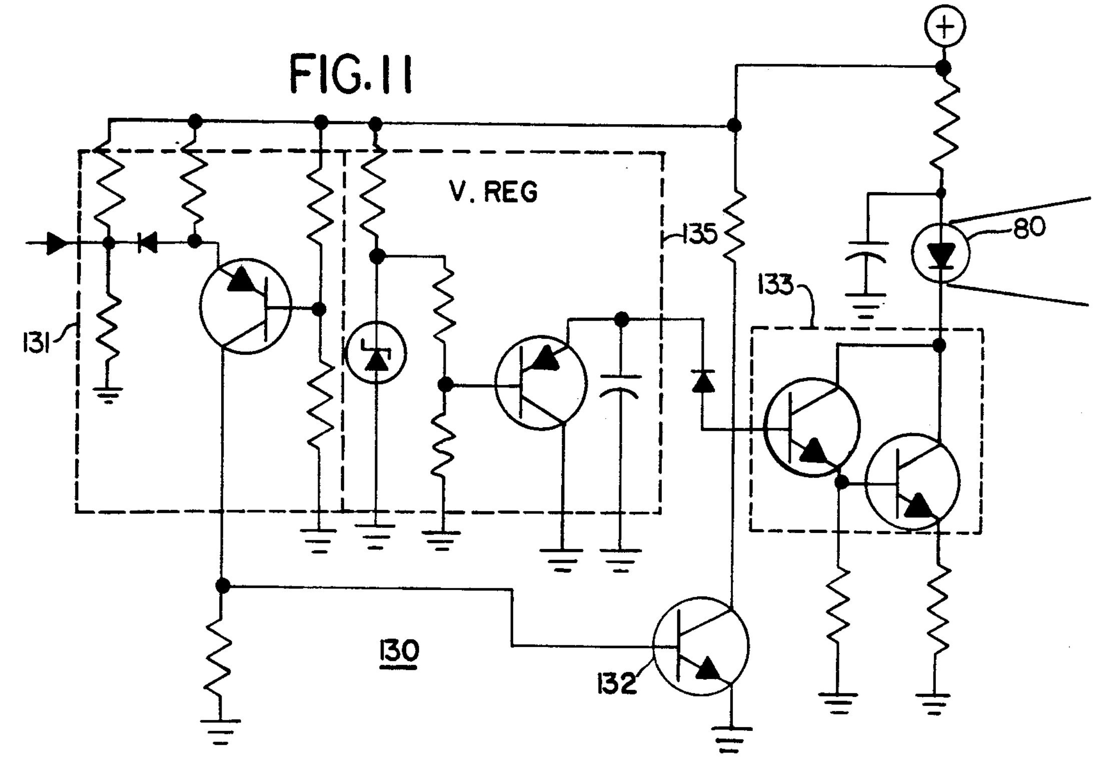
FIG. 11 is an electrical schematic diagram of the optical head transmitter circuit; and, FIG. 12 is an electric schematic diagram of the optical head receiver circuit.

Now referring to FIG. 11, the transmitter circuit or modulator 130 of the optical unit 10 may be seen as including a pulse shaper 131 and an inverting amplifier stage 132 connected to the input of a two-stage power amplifier 133 which applies output pulses across diode 134. The photo-emitter diode 134 constitutes the light or radiation source for the system. The modulator also includes a Zener diode voltage regulator stage 135 which compensates for voltage fluctuations at the transmitter.

The preferred radient energy source, diode 80, used in this invention is an infrared emitter such as a gallium arsenide diode which emits energy in the 900 nanometers wavelength region responsive to current passage when in its conducting condition. Then energy emitted is noncoherent as compared with the output of a laser and since it is relatively near the visible spectrum (400–700 nanometers) exhibits properties much like visible light. We have found that gallium arsenide diodes type GE SSL34, GE SSL35 of the General Electric Co., Schenectady, N.Y., and type TIXL–24 of the Texas Instruments Co. of Dallas, Tex., are eminently suited for use in this invention.

The diode 80 is located at the focus of its associate lens which collimates the emitted beam into the transmitted beam approximately 6.5 milliradians wide.

Figure 12:
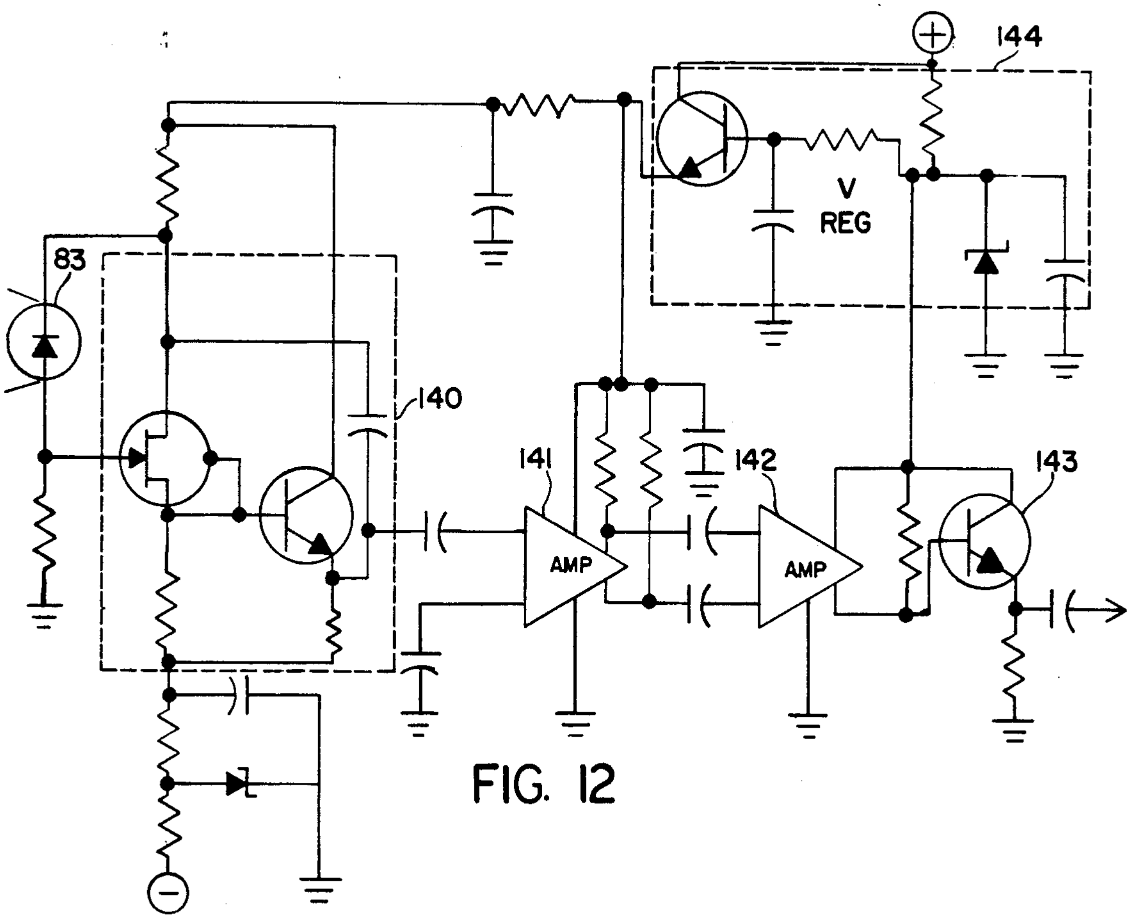

The receiver of the optical unit is shown in FIG. 12 as including a photo diode 83 located at the focus of its associated lens and connected to drive a field effect transistor current amplifier 140 which drives two amplifier stages 141 and 142 and an impedance matching stage 143. Similar to the transmitter, the receiver includes a Zener diode voltage regulator 144.

The photo diode 83 of the receiver is preferably a silicon diode sensitive to infrared energy in the 900 nanometer range, characterized by low internal noise and sufficient transient response to respond to received pulses at up to 1 megabit per second rate. Suitable photo diodes are of the type 4220 silicon diode of the Hewlett-Packard Co. of Palo Alto, Calif.

Interface transmitter section

The above described transmitters and receiver optical units each are served by respective transmitter and receiver sections of the interface unit 11 which connects the optical transmitter and receiver to the computer or data unit which it is to serve. The interface unit transmitter portion of the system receives a digital bit stream from the computer or data source and converts it into the proper form for modulating the infrared emitting diode 80 of FIG. 3. The circuit arrangement making up the transmitter portion of the interface unit 11 and its timing sequence are illustrated in FIGS. 7 and 8. FIG. 7 shows in block diagram form the transmitter logic 70 of FIG. 3 with the signals appearing at significant portions of the circuit identified by letters A through J. The timing and waveform of each of those signals appears in FIG. 8 opposite its respective letters.

Now referring to FIG. 7 in conjunction with FIG. 8, the transmitter section 70 includes its local oscillator 74 providing locally generated clock pulses which synchronize the system whenever local control INT is selected by switch 77 as described below. Synchronization also is accomplished on pulses B on lead 73C from the local data source when switches 77 are in their external position EXT.

Data to be transmitted through the system (Plot A of FIG. 8) arrives on lead 73 and is introduced into a pair of AND gates 78 and 79 which are normally enabled via switches 88 and 89 and inverting amplifiers of the test circuit for the system. Incoming pulses are therefore applied to drive a flip-flop 97 which in turn applies opposite phase pulse trains over leads 98 and 99 to a pair of AND gates 101 and 102. The AND gates are controlled by clock pulses from a two stage counter 103. Clock pulses are introduced from lead 73C into a synchronizer 104, the output of which is applied via lead 105 to the counter 103. The counter 103 provides the enabling input of the gates 101 and 102. One of the gates will pass the appropriately poled pulse to a number of parallel connected driver amplifiers 105 through an OR gate 106.

The synchronizer 104 operates from the same clock as accompanies the data. With switches 77 at their INT settings, internal clock is controlled by flip-flop 108. With an external clock setting of switches 77, synchronizer 104 is controlled by the external clock input B from lead 73C. When either internal or external synchronization is employed, the proper clock is applied through lead 71 and a pair of dividers 107 and 108 provide proper frequency pulses G to the counter 103.

In general, the function of this transmitter unit is to amplify and transmit received data to its associated optical unit in synchronization with its own locally generated clock pulses or those from the data source.

Interface receiver section

Figures 9, 10:
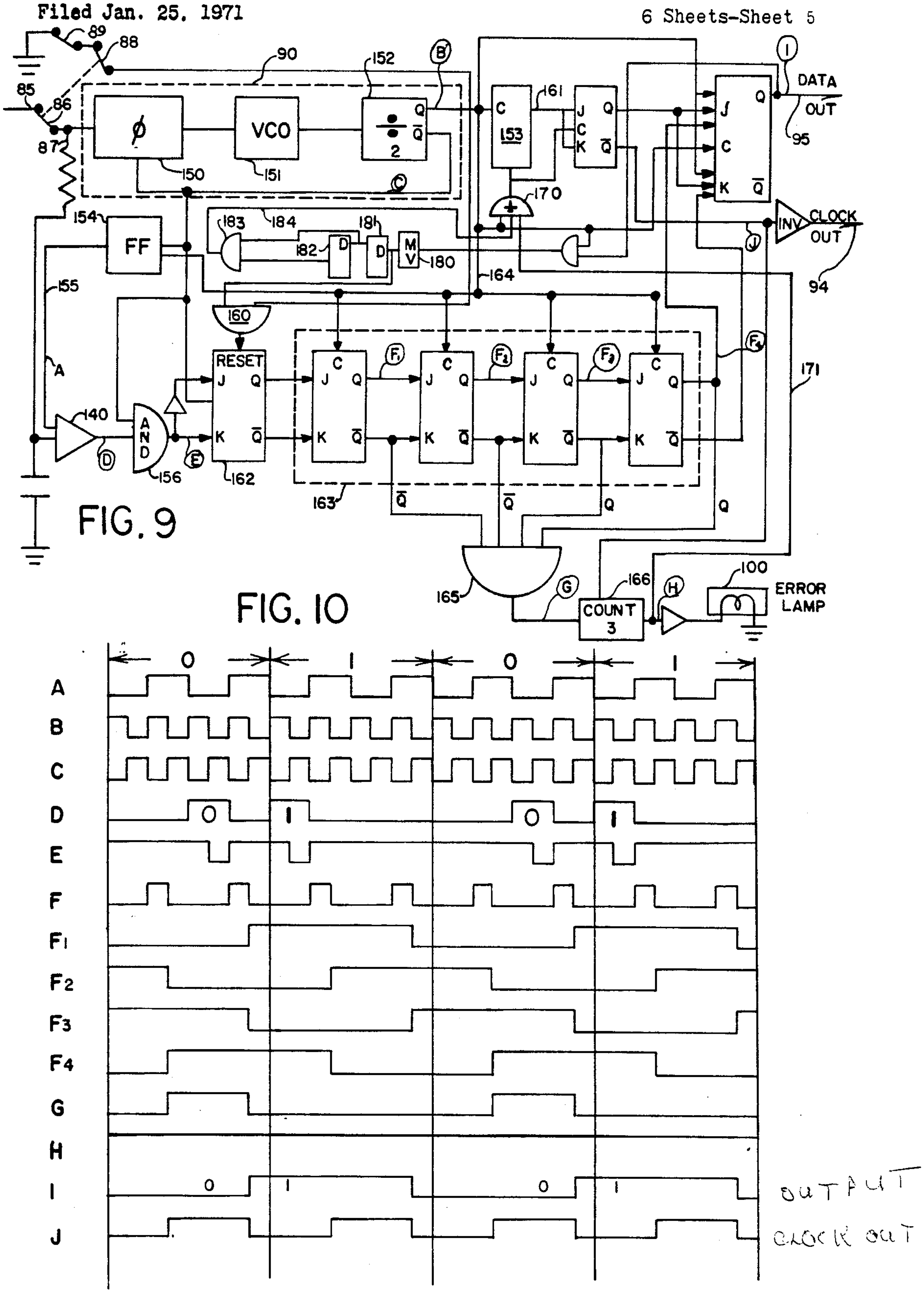
FIG. 9 is a block diagram of the receiver subsystem of this invention.
FIG. 10 is a receiver timing diagram.

Now refer to FIGS. 9 and 10. The synchronization of the receiver with its transmitter and detection of incoming data is accomplished in the subsystem of FIG. 9. Here, incoming data on lead 85, represented as plot D in FIG. 10, is introduced via normally closed loop test switch 86 to the phase-locked loop circuit 90 and simultaneously over lead 87 to a synchronous detector 140.

The phase-locked loop circuit 90 includes a phase detector 150 receiving incoming data from lead 85 and a locally generated frequency generated by voltage controlled oscillator 151 and divided by 2 in divider 152. The phase-locked loop circuit 90 is effective to lock the receiver at quadruple the frequency of the incoming data. A train of pulses from the voltage controlled oscillator 152 (Plot B of FIG. 10) are introduced into a flip-flop 153 and in opposite phase (Plot C of FIG. 10) into flip-flop 154, the pulse train A over lead P provides the reference input to synchronous detector 140. The output of the synchronous detector 140 is introduced into AND gate 156 along with the reference input C. The reference signal establishes the sampling period during which the system looks for the presence of a pulse 1 or absence of a pulse 0 during the sample periods which are selected as the first and third quarter of each bit. Detected pulses (Plot E of FIG. 10) are introduced into a flip-flop 162 which serves to introduce detected pulses into a four stage shift register 163. The shift register 163 is supplied with clock pulses (Plot B of FIG. 10) over lead 164 from the phase-locked loop 90 to advance the sampled pulses through the shift register 163.

The content of the shift register is constantly sampled at the $\bar{Q}$, $\bar{Q}$, Q and Q outputs of each respective stage and introduced into AND gate 165. As long as a valid code (010 bit pattern) appears in the shift register timed correctly with clock J, the gate 165 will reset a count 3 counter 166 at the output of AND gate 165 back to zero and no output H (error signal) will be transmitted from the counter 166 to error lamp 100 and over lead 171 to the flip-flop 153.

If the counter 166 receives a valid code not timed correctly with clock J for three consecutive code time, it applies illuminating power to lamp 100 and provides a clock adjusting pulse to clock control logic gate 170 over lead 171. When the system is in lock, no output signal (Plot H of FIG. 10) is produced and data is advanced on lead 95 for the associated data utilization device. Clock pulses for external use are also available on lead 94.

Employing this system, the receiver of the interface unit 11 is phase-locked to incoming data to provide synchronization and each bit as received is checked for unique code content with respect to clock J, the absence of which results in a resetting of the clock controlling the advance data to the system associated data utilization device. When synchronization is achieved, resetting attempts cease.

The system also includes test function of both internal operation and loop operation to insure proper functioning of the system. Internal operation is checked by operating switch 88 which is mechanically coupled to switch 86 to open the ground connection to lead 89 and intercept incoming data on lead 85 and transfers it to the test signal input T*x*. The voltage controlled oscillator 151 is then locked to the local transmitter and a series of alternating ones and zeroes is introduced into the shift register 163 indicative of a valid code condition.

The train of bits being valid signals is passed to the output lead 95. The lamp 100 will not light when the local interface unit is internally synchronized.

A full system check is made by operating switch 89 which tests system synchronization with incoming data or synchronizing pulse from the opposite station.

To ensure complete testing, when either 88 or 89 is operated, a monostable multivibrator 180 is activated and operates for one-half second, and the output pulse is applied to gate 160 to inhibit data in flip flop 162. The output of multivibrator 180 is also introduced into a pair of flip flop circuits 181 and 182 which cooperate to produce a single clock pulse at the output of the AND gate 183. This additional clock pulse is introduced via lead 184 to the gate 170 controlling the local clock rate. The injection of an additional clock pulse shifts the data by one bit to attempt synchronization.

When the data set is idling (no data being transferred, the transmitter is forced to the mark (1) data state. The receiver monostable multivibrator 180 monitors the data output 95 and if no data is transmitted for one-half second, ensures that the data output is mark (1) state by correcting the clock through OR gate 170.

From the foregoing description it is apparent that we have invented a new data transmission system which eliminates most of the limitations of prior art systems. It is capable of transmission of data in synchronism with the data source and provides a source of clocking pulses when required. The system maintains constant synchronism between stations whether data is being transmitted or not. The system includes manual test controls to allow both station and loop synchronism and operations to be tested at any time.

The above described embodiments of this invention are merely descriptive of its principles and are not to be considered limiting. The scope of this invention instead shall be determined from the scope of the following claims including their equivalents.

We claim:

1. A system for transmitting digital data between two digital data installations in which at least one constitutes a source of digital data and the second a utilization device for digital data comprising:

a first interface unit connected to the source of digital data;

a second interface unit connected to a data utilization device;

an optical transmitter connected to said first interface to convert electrical signals from said first interface unit into pulse modulated radiant energy;

an optical receiver positioned in spaced facing relationship with said optical transmitter for receiving pulse modulated radiant energy from said optical transmitter and for converting said radiant energy into a train of electrical pulses;

said first interface unit including, logic means for generating a pulse sequence representative of each bit of incoming information from said digital data source, means for synchronizing said pulse sequences with each bit of incoming information, and means for passing said pulse sequences to said optical transmitter;

said second interface unit including, a data detector, phase locked loop means for synchronizing said data detector with incoming pulse sequences, error logic means for detecting a valid pulse sequence in the electrical signals received from said optical receiver, means for indicating the absence of valid pulse sequences, and means for converting received pulse sequences to digital data format compatible with said data utilization device.

2. The combination in accordance with claim 1 wherein said first interface means includes a clock generator and means for selectively connecting said clock generator to said synchronizing means whereby said interface unit is synchronized with said clock generator rather than with incoming information.

3. The combination in accordance with claim 1 wherein said optical transmitter includes diode means responsive to the passage of electrical pulses therethrough for producing pulses of radiant energy in the order of 900 nanometers in wavelength.

4. The combination in accordance with claim 3 wherein said optical transmitter includes lens means for collimating the radiant energy from said diode means.

5. The combination in accordance with claim 1 wherein said optical receiver includes diode means responding to radiant energy in the order of 900 nanometers in wavelength.

6. The combination in accordance with claim 5 wherein said optical receiver includes lens means focusing received radiant energy on said diode means.

References Cited

UNITED STATES PATENTS

| | | | |
|---|---|---|---|
| 3,302,114 | 1/1967 | Hertog | 325—30 |
| 3,341,707 | 9/1967 | Wingfield et al. | 250—199 |
| 3,511,998 | 5/1970 | Smokler | 250—199 |
| 3,610,755 | 10/1971 | Wieberger et al. | 250—199 X |

BENEDICT V. SAFOUREK, Primary Examiner

U.S. Cl. X.R.

325—38 R